Dec. 24, 1968  V. F. COTY  3,418,208
GROWING INCREASED YIELDS OF MICRO-ORGANISMS
Filed Feb. 28, 1966  2 Sheets-Sheet 1

INVENTOR.
VERNON F. COTY

BY A. H. Caser
ATTORNEY

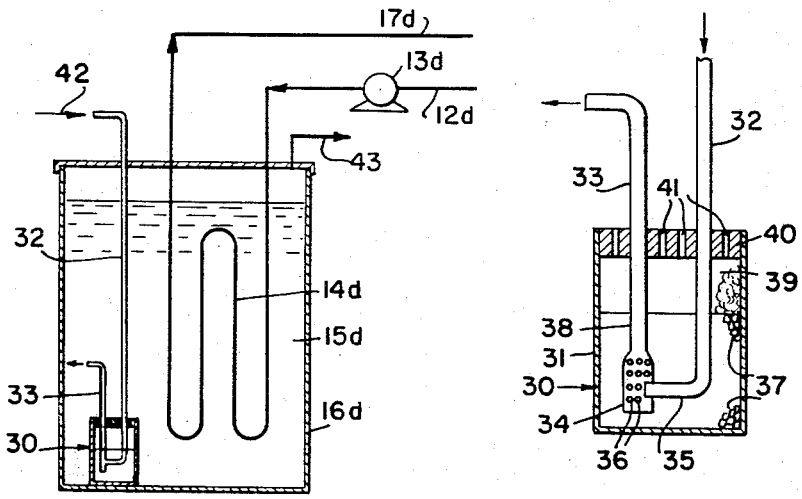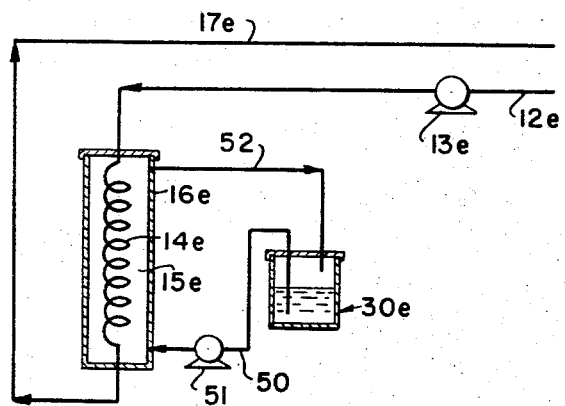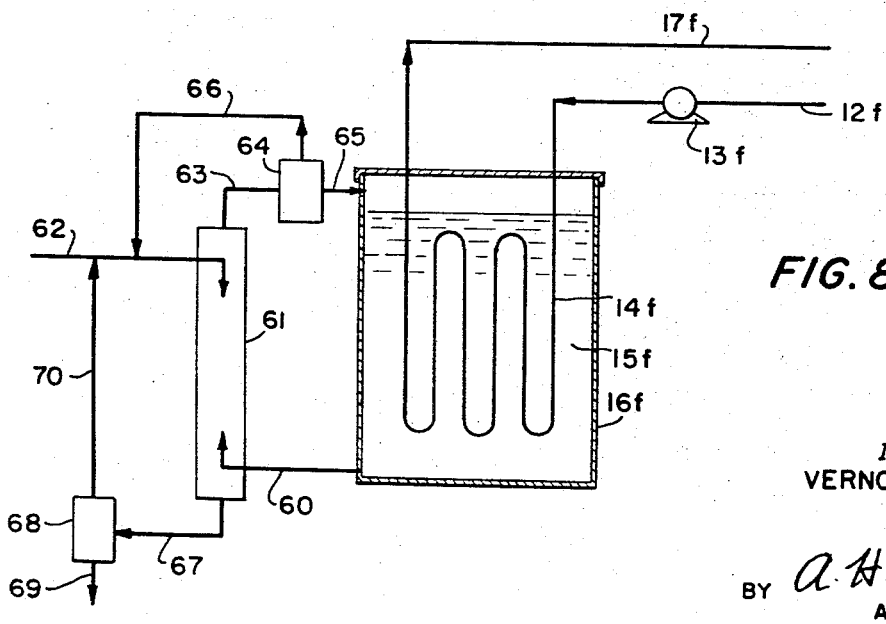

United States Patent Office 3,418,208
Patented Dec. 24, 1968

3,418,208
GROWING INCREASED YIELDS OF
MICRO-ORGANISMS
Vernon F. Coty, Trenton, N.J., assignor to Mobil Oil
Corporation, a corporation of New York
Filed Feb. 28, 1966, Ser. No. 530,637
9 Claims. (Cl. 195—1)

ABSTRACT OF THE DISCLOSURE

A method is provided for increasing the growth of micro-organisms by dialyzing a culture mixture containing them against an unfermented aqueous liquid to take up therein cell growth inhibitors, removing such inhibitors from the liquid, and reusing the latter.

Figure 1:
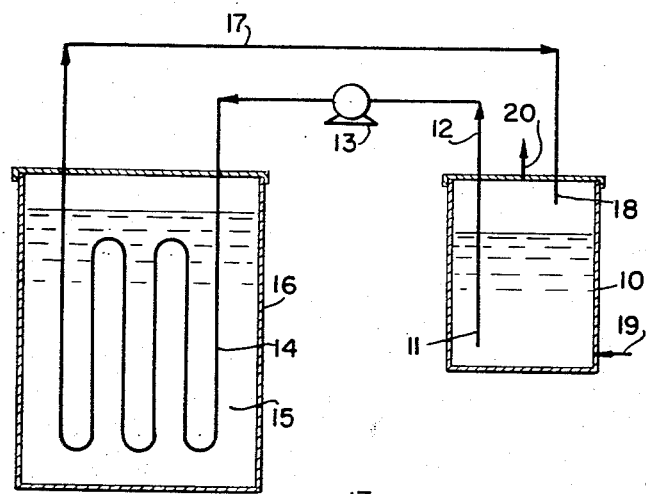

This invention relates to a method for increasing the growth of micro-organisms while supplying to them a hydrocarbon as the sole source of carbon for both growth and energy.

Increasing the growth rate of micro-organisms, particularly by using a hydrocarbon as the source of carbon, is of importance in view of the ability of many species to produce from low cost hydrocarbons valuable products like protein material in appreciable amounts, a fact which makes them of value as feed for cattle and other animals. The rate of formation of protein increases with the rate of cell growth, and as a result, less time is required before harvesting of the cells may take place.

The invention is also of importance in that the organisms may synthesize, in addition to protein, such compounds of value as amino acids; organic acids like citric acid; lipids; antibiotics, certain vitamins, etc. Also the hydrocarbon used as the source of carbon may undergo microbial oxidation with the formation of interesting derivatives. Thus, certain hydrocarbons, such as n-decane, are not only capable of supplying carbon to the organism, but also, and during the course of being utilized, are converted by the organism into various oxygenated hydrocarbon products, including aldehydes, ketones, acids, and esters, many of which are of higher value than the starting hydrocarbon. These various synthesis products may be formed in the cells or secreted by them into the medium in which the cells are growing, and in either case may be recovered. The protein material, however, is formed intracellularly.

The invention, briefly, comprises incubating in a first zone a micro-organism as herein defined with an aqueous mineral salts nutrient in the presence of oxygen and, as sole source of carbon, a hydrocarbon. The cells grow in the culture mixture and produce various products, at least some of which are capable of inhibiting growth and which for this reason may be designated toxic metabolic products, or staling factors. Continuously with the growth of the cells, the culture mixture, or at least the liquid portion thereof containing the toxic products, is removed from the said zine in a continuous stream, the amount of which is variable, and passed into a dialyzing zone for selective removal of the said products. In this zone the mixture is moved along one side of a dialysis material while an aqueous mineral medium is disposed on the opposite side thereof, and during such step the said products leave the mixture and pass through the dialysis material to the mineral medium, thereby purifying the mixture to an extent. The latter then leaves the dialysis zone and passes back to the first zone where cell growth is taking place. At the end of the process, a yield of cells is obtainable which is up to 8 or more times greater than that obtainable in the absence of the dialyzing step.

At least some of the cell metabolic products, including the toxic ones, are of value per se and justify recovery.

Considering the invention in more detail the method is applicable to any aerobic microbial species which is able to utilize a hydrocarbon as the sole source of carbon for energy and growth, including hydrocarbon-utilizing species of bacteria, fungi, yeasts, and molds. Nonfastidious organisms are preferred, i.e., those which will grow in simplified salts media without necessity for additions of organic compounds. Species which are active animal or human pathogens are excluded.

Of the bateria, suitable genera include: Pseudomonas, Bacillus, Flavobacterium, Sarcina, etc. Illustrative species of these genera are *P. aeruginosa, P. oleovorans, P. putida, P. boreopolis, P. methanica, P. fluorescens, P. pyocyanea; B. aureus, B. acidi, B. subtilis, B. urici, B. cereus, B. coagulans, B. mycoides, B. circulans, B. megaterium; Flavobacterium aquatile; Sarcina alba, Sarcina lutea, Leuconostoc mesenteroides* is a useful micro-organism. A preferred genera is Pseudomonas, most species of which are able to utilize hydrocarbons.

Other preferred genera are Achromobacter and Nocardia, as illustrated by species such as *A. xerosis, A. agile, A. gutatus, A. superficialis, A. parvulus, A. cycloclastes; N. salmonicolor, N. asteroides, N. minimus, N. opaca, N. corallina, N. rubra,* and *N. paraffinae*. The Nocardia are of particular interest because many species thereof, including the foregoing, utilize gaseous C-2 to C-5 hydrocarbons. Other microorganisms which utilize gaseous hydrocarbons having 2 to 5 carbon atoms comprise the genus Mycobacterium, including such species as *M. paraffinicum, M. phlei, M. lacticola, M. rhodochrous, M. smegmatis,* etc. Many Pseudomonas utilize C-1 to C-5 hydrocarbons.

Still other hydrocarbon-utilizing bacteria are *M. methanica* and *M.* species from the genus Methanomonas; *Micrococcus paraffinae; B. aliphaticum, B. hidium,* and *B. benzoli* from the genus Bacterium; and species of Micromonospora.

Of the fungi, the method is applicable to any fungus within the classification Eumycetes or true fungi, but preferably those from the class Fungi Imperfecti or from the class Phycomycetes.

Preferred fungi from the class Fungi Imperfecti are species of the genera Aspergillus and Penicillium, as illustrated by *A. niger, A. glaucus, A. oryzae, A. flavus, A. terreus, A. itaconicus; P. notatum, P. chrysogenum, P. glaucum, P. griseofulvum, P. expansum, P. digitatum, P. italicum,* etc. Other suitable organisms include various species of the genera Monilia, Helminthosporium, Alternaria, Fusarium, and Myrothecium.

Preferred fungi of the class Phycomycetes include species from the genera Rhizopus and Mucor, such as *R. nigricans, R. oryzea, R. delemar, R. arrhizus, R. stolonifer, R.* sp.; *M. mucedo, M. genevensis.*

Some of the foregoing genera of fungi are also characterized as molds, such as Aspergillus, Penicillium, Rhizopus, and Mucor, but it will be understood that all are true fungi or Eumycetes.

Of the yeasts, the preferred organisms are of the family Cryptococcaceae, and particularly of the subfamily Cryptococcoidae. Preferred genera are Torulopsis (or Torula) and Candida. Preferred species are *Candida lipolytica, Candida pulcherrima, Candida utilis, Candida utilis variati major, Candida tropicalis, Candida intermedia,* and *Torulopsis colliculosa.* Other useful species are *Hansenula anomala, Oidium lactia,* and *Neurospora sitophila.*

The hydrocarbon may be chosen from a broad selection, including aliphatic, aromatic and alicyclic compounds of varying molecular weight and carbon configurations. Crude oils, various petroleum fractions, residua, etc. are suitable. A preferred class of hydrocarbons comprises alkanes having up to 20 or 30 carbons, more preferably those that are gaseous or liquid at normal temperatures and pressures, and including straight and branched-chain, saturated and unsaturated hydrocarbons.

In particular, normally gaseous hydrocarbons have an advantage in that any unused compound does not remain in the incubation mixture when the process is completed, but rather can simply be passed off to the atmosphere or recycled, thus avoiding separation problems. Gaseous hydrocarbons are also more economical; and they do not present problems of accessibility to the micro-organism since, being gaseous, there is no question of the micro-organism becoming imbedded in or occluded by the hydrocarbon. High concentrations of gaseous hydrocarbons are thus tolerated. A further advantage is that in a continuous process, or in a batch system having a plurality of incubators, the gaseous hydrocarbon may be easily flowed through the continuous process, or from incubator to incubator in the batch system, and may be recycled. By the term normally gaseous hydrocarbons there is meant those which are gaseous under the conditions of the process, i.e., gaseous at temperatures up to about 55° C. Suitably, these compounds include hydrocarbons having 2 to 5 carbon atoms, more desirably 3 to 4 carbons, and particularly straight chain alkanes. In some cases methane is suitable.

Another preferred class comprises alkyl-substituted cyclic compounds having 1, 2, or more alkyl substituents each of any suitable length and comprising straight- or branched-chain, saturated or unsaturated radicals, and in which the cyclic moiety is aromatic or cycloparaffinic.

Alkyl-substituted aromatic hydrocarbons include toluene, the various xylenes, mesitylene, ethylbenzene, p-cymene, the diethylbenzenes, and the isomeric propylbenzenes, butylbenzenes, amylbenzenes, heptylbenzenes, and octylbenzenes. Included among the alkyl-substituted cycloparaffins are methylcyclopentane, the dimethyl- and tri-methylcyclopentanes, ethylcyclopentane, the diethylcyclopentanes, the various propyl-, butyl-, amyl-, hexyl-, and octylcyclopentanes. Also the alkylcyclohexanes, which are substituted in a manner corresponding to the foregoing alkylcyclopentanes, and further including such compounds as the various tetramethylcyclohexanes, methylethylcyclohexanes, methylpropylcyclohexanes, and the like.

It will be understood that the foregoing hydrocarbons are suitable sources of carbon for cell growth and energy and are capable of being incubated with the cells. In this function the hydrocarbons not only supply carbon but also induce the production by the cells of closely related oxygenated derivatives of the hydrocarbons, such as alcohols, aldehydes, esters, acids, and other derivatives.

The aqueous mineral salt nutrient is conventional, comprising a source of nitrogen such as nitrate or nitrite or ammonium salt or urea, and such ions as potassium, iron, calcium, magnesium, phosphate, and sulfate, as well as ions of trace elements like zinc, manganese, copper, molybdenum, etc. Iron is omittable in some cases. As water is included in the nutrient mixture, most of these mineral salts will usually be present in sufficient quantity in ordinary potable water supplies. However, it is desirable to add the salts to the mixture to insure their presence in sufficient quantity for growth. Usually the mixture consists primarily of water, which may constitute 99%, or more, by weight of the liquid phase of the mixture, although it may also constitute a lesser portion, going down to 50% of the liquid phase. Generally, any proportion of water heretofore employed in microbial synthesis may be used.

A suitable mineral salts mixture may be listed as follows, the components being dissolved in enough water to make one liter of solution:

| | G. |
|---|---|
| Ammonium sulfate | 1.0 |
| Potassium dihydrogen phosphate | 2.0 |
| Sodium monohydrogen phosphate | 3.0 |
| Magnesium sulfate | 0.2 |
| Calcium chloride | 0.01 |
| Ferrous sulfate | 0.005 |
| Manganese sulfate | 0.002 |
| Sodium carbonate | 0.1 |
| Urea | 1.5 |

The method generally comprises incubating the micro-organism in the mineral nutrient in the presence of the hydrocarbon and oxygen. During incubation, the culture mixture is maintained under conditions to insure optimum growth of the micro-organism. The temperature for example should be maintained between about 20° and about 55° C., preferably from 20 to 30° C. The pH is maintained near neutrality, namely, about 7.0, although it may range between about 5.5 and 8.5. It is desirable to maintain the mixture in a condition of agitation as by shaking, or by using propellers, paddles, rockers, stirrers, or other means ordinarily employed for effecting agitation of a liquid mixture. The fermentor may be open to the atmosphere, and with agitation of the mixture, the surface thereof exposed to the atmosphere is continuously renewed and oxygen is taken up. However, where the hydrocarbon is normally gaseous, the reactors are closed, and oxygen may be supplied by bubbling it or air through the mixture, preferably in company with the hydrocarbon, thereby also providing desired agitation.

After growth is underway, with the production of various products of cell metabolism, including the described toxic or growth-inhibiting products, there is begun the transfer of the culture mixture, or at least the liquid portion thereof containing the said products, preferably in small amounts in order not to adversely affect the incubation step, to the dialysis membrane for conduct of the dialysis step. This step is preferably carried out continuously, and without ceasing agitation or the addition of hydrocarbon and air in the fermentor, by pumping the mixture or liquid from the fermentor to the dialyzing zone where it is moved along one side of the dialysis membrane while a fresh or unfermented aqueous mineral salts medium is disposed on the other side. Suitably, the medium in the dialyzing zone is agitated. After traversing the dialysis flow path, the mixture or liquid is returned to the fermentor. This returned portion will contain less toxic products than when it left the fermentor, and hence it is in a favorable condition for further growth of the cells.

More particularly, during movement of the culture mixture, or the liquid portion of the same, along the dialysis material, it is considered that products which have gradually accumulated therein as the result of cell metabolism are transferred through the dialysis membrane into the unfermented medium, thus reducing the concentration of these products in the mixture or liquid portion and rendering it a more favorable vehicle for cell growth. Similarly, nutrients in the unfermented medium may transfer through the dialysis material into the culture mixture or liquid and further improve its quality as a vehicle for cell growth. Thus, whether cell growth in the fermentor is inhibited by the presence of toxic metabolic products, or by the absence of nutrients leading to partial starvation, the effect of the dialysis step is to relieve both causes.

As substantially the foregoing phenomenon takes place in electrodialysis, where the mixture to be dialyzed is subjected to an electric field, it is to be understood that dialysis, as used herein, is intended to include electrodialysis.

If the growth is such that the microbial population of the culture mixture excessively thickens the latter, it is well to remove at least a part of the cells and to add aqueous nutrient to enable further growth to proceed.

After termination of the incubation period, the cells are harvested, conveniently by centrifuging, filtration, spray drying, settling, or other conventional way, and then may be dried. In some cases separation of the cells may not be necessary, as where the entire incubated mixture is used in or as an animal feed or as a fertilizer material.

Yields of dry cells may range up to 8 or more times greater than those produced by like methods but which omit the dialysis step.

Intracellular products may be recovered conventionally, as by rupturing the cell walls and extracting the products from the resulting debris, and thereafter separating the extract further as desired. Extracellular products are recoverable by conventional methods, and it should be noted that at least some of these products are dialyzed and may be recovered as hereinafter described.

As illustrated by FIGURES 1–8, several modifications of the method are possible.

In FIGURE 1, the culture mixture in fermentor 10 is removed through the open end 11 of line 12 by pump 13 to a dialyzing material in the form of the regenerated cellulose tubing 14 disposed in the fresh unfermented aqueous mineral medium 15 in the tank 16. The mixture is then returned to the fermentor 10 by line 17, being discharged from the open end 18. At 19 a mixture of air and gaseous hydrocarbon may be introduced to the fermentor and any excess is removed through line 20 and advantageously recycled.

Figure 2:
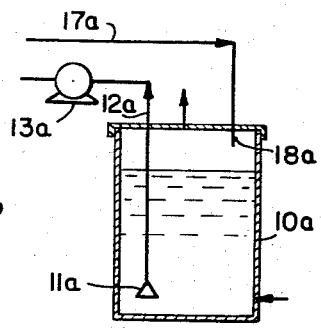

In FIGURE 2, a modification of FIGURE 1 is shown comprising the provision on the outlet line of the fermentor of a filter 11a. The mixture in fermentor 10a is continuously removed through line 12a by pump 13a, but in this case it is first filtered by the filter 11a to remove the cells, which remain in the fermentor. The filtered liquid, including toxic products, is subjected to dialysis as in FIGURE 1, and then returns to the fermentor by line 17a, being discharged from the open end 18a. According to this modification, all of the cells in the fermentor are available for growth at any given time, it being unnecessary to circulate the cells through the tubing.

Figure 3:
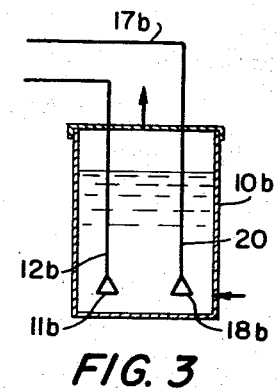

In FIGURE 3, a modification of FIGURE 2 is shown comprising an extension 20 on the inlet line 17b to the fermentor 10b so that the end of the line extends below the level of the culture mixture. Additionally, such end of extension 20 is provided with a filter 18b. According to this modification, liquid is taken into line 12b through filter 11b and then treated as described in FIGURE 1. The returning liquid enters the fermentor through line 17b, extension 20, and filter 18b. After operation in this way has continued for a time, the direction of flow of the liquid is reversed; thus, it leaves the fermentor through filter 18b, extension 20, and line 17b, and returns to it through line 12b and filter 11b. An advantage of the method is that the liquid returning to the fermentor through either filter tends to wash away any cell material which may have deposited in or on the pores of the filter. In this way both filters are mainttined in an efficient free-running state.

Figure 4:
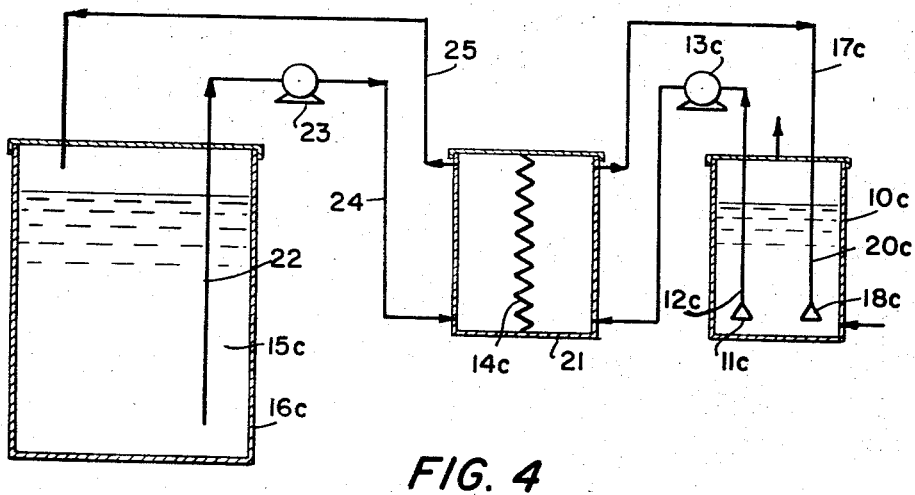

In FIGURE 4, cells are grown in the fermentor 10c, as in FIGURE 3. Liquid is removed through filter 11c and line 12c by pump 13c and sent to the dialysis zone 21 where it moves along a plate and frame type dialysis membrane 14c to permit dialysis to take place. Membrane 14c may have a flat shape, or preferably and as shown, a zigzag shape to increase the available surface area. The dialyzed liquid leaves zone 21 by line 17c and returns to the fermentor as in FIGURE 3. In tank 16c fresh nonfermented mineral medium 15c is stored and is continuously removed through line 22 by pump 23 and sent by line 24 to zone 21 where it flows along the opposite side of the membrane, then leaving the zone by line 25 to return to tank 16c. By periodically reversing the flow of liquid leaving and entering the fermentor by lines 12c and 20c, respectively, the advantages of the method of FIGURE 3 are obtainable.

In FIGURE 4 cocurrent flow is shown on opposite sides of the membrane, but it may be countercurrent.

A modification of the invention is shown in FIGURE 5 which is applicable to all of the preceding figures and which provides for the continuous removal from the mineral salts medium in the dialysis tank of water soluble metabolic products of the cells, which products pass through the dialysis membrane. According to this modification an adsorber is used to remove the said products, including those which are toxic to further growth of the cells. The adsorber is shown at 30, positioned on the floor of the tank 16d and immersed in the mineral medium 15d. It will be understood that the adsorber may be outside the tank as well as inside. An enlarged schematic view of the adsorber is shown in FIGURE 6 where it may be seen to comprise a container 31 having an air inlet tube 32 and an outlet tube 33. Tube 33 has an enlargement 34 which is entered by the exit portion 35 of tube 32 and which is provided with a plurality of openings 36. The enlargement 34 and the portion 35 are covered by granules 37 of an adsorbent the amount of which is sufficient to completely cover the enlargement and a portion 38 of the exit tube 33. Glass wool 39 or other suitable porous inert spacing material is disposed above the granules to help keep the adsorbent compactly positioned in the container. The latter is stoppered by a cover 40 through which the tubes 32 and 33 extend and which is provided with a plurality of apertures 41.

During operation, the culture mixture from the fermentor is drawn through line 12d (FIG. 5) by pump 13d and passed through the dialysis tubing 14d, the length of which, as will be understood, may be as desired. After dialysis, the material in the tubing leaves through line 17d, and returns to the fermentor. The latter is not shown, but as noted above, may be any one of those set forth in FIGURES 1–4. During dialysis, metabolic products of the cells leave the tubing and enter the medium 15d. These products together with mineral medium enter the container 31 through the openings 41, pass through the porous glass wool, and enter the adsorbing section to make contact with the granules 37. Meanwhile an air flow is established, according to which air from a source not shown enters the system through lines 42 and 32, then passes into the enlargement 34, then upwardly in tube 33 and out into the mineral medium 15d. The air collects in the space over the medium and may be removed by line 43. The passage of the air upwardly through the enlargement 34 creates an aspiration effect by means of which the medium in the adsorbent section is drawn into the enlargement through the openings 36 and passes upwardly in tube 33 to join the main body 15d of medium. During passage of the medium through the bed of adsorbent, metabolic products are adsorbed on the latter and are retained, so that the medium which leaves the adsorber through line 33 is purified.

The method of FIGURE 5 provides certain advantages. Thus by continuously removing from the fermentor metabolic products of the cells, the latter are maintained in a healthy state throughout the course of their growth. In turn, good growth of the cells is obtained. In addition, the mineral salts nutrient in both the fermentor and the dialysis tank is maintained in good condition, conducive to good cell growth. Also, the metabolic products may be recovered from the adsorbent and useful compounds separated therefrom.

Instead of air, a pump may be used to circulate mineral medium through the adsorber of FIGURE 5 and may be located outside of the tank 16d and have line 33 connected to it on its inlet side and line 32 connected to its outlet or discharge side. Also, the adsorber 30 may be mounted on the tank, say at the top thereof above the liquid level, or at one side on the outer surface of a wall, or it may be spaced from the tank as in FIGURE 7, described next.

Instead of placing the adsorbent material in the container 31, it is also feasible to disperse it, as by agitation, throughout the mineral medium in tank 16d so that it continuously makes contact with the entire volume of the medium.

In view of the continuous removal of the cell metabolic products that inhibit cell growth, a large amount of mineral medium, i.e., larger than the amount in the fermentor, is not required. Thus, tank 16d can be replaced by one of the same size as the fermentor, or, as shown in FIGURE 7, by a much smaller one. In FIGURE 7, the mixture to be dialyzed is drawn from the fermentor, which is not shown but which may be any of those illustrated in FIGURES 1–4, through line 12e by pump 13e and passed through dialysis tubing in the form of the coil 14e immersed in mineral medium 15e in the tank 16e which is of smaller size than the fermentor shown in FIGURES 1–4. Mineral medium is continuously removed from the tank through line 52 and delivered to absorber 30e for removal of the said metabolic products and then passed back to the tank through line 50 by pump 51. The flow of mixture versus medium may be countercurrent as shown or cocurrent. Suitable provision may be made for replenishing the medium, as its mineral content becomes depleted, with fresh medium, for which purpose the latter may be added either to tank 16e or, preferably, to the fermentor.

An advantage of the arrangement of FIGURE 7 is the reduction in size of the apparatus and of the amount of mineral medium. Besides the economies thereby resulting, there is a saving of space, which frequently can become a factor of importance. Another advantage is the improvement in the efficiency of the dialysis step resulting in the flowing of the mineral medium past the dialysis membrane.

In FIGURE 8 a solvent extraction step is illustrated as useful for removing cell metabolic products from the mineral medium in the dialysis tank. The latter is shown as in FIGURE 1 but may be like any of those used in FIGURES 2–4. With culture mixture circulating through the system comprising line 12f, pump 13f, tubing 14f, line 17f, and the fermentor, the latter not shown but suitably like any of those previously described and illustrated, mineral medium 15f is removed either periodically or continuously from tank 16f through line 60 by means not shown to a solvent extraction unit 61 where it flows countercurrently to a down-flowing selective solvent introduced through line 62. Suitable selective solvents for the metabolic products are chloroform or carbon tetrachloride, which are heavier than the mineral medium. Other suitable solvents include ethylene dichloride, chlorobenzene, carbon disulfide, etc. The medium, depleted in metabolic products, leaves the unit by line 63 and enters an evaporator or stripper 64 where carry-over solvent is evaporated off, the medium then re-entering the tank by line 65 and the solvent being recirculated by line 66. Solvent and dissolved products leave unit 61 by line 67 and pass to an evaporator 68 for removal of the solvent, the latter being recirculated by line 70 and the products recovered through line 69.

Selective solvents lighter than the mineral medium are useful, such as ethyl acetate, diethyl ether, benzene, hexane, pentane, petroleum ether, etc., and in this case the flows of FIGURE 8 are reversed so that mineral medium enters the unit 61 at the top and solvent at the bottom.

The solvent extraction step described is also suitable in the method of FIGURE 7 where it may replace the adsorption step indicated at 30e.

It is of course advantageous to operate the foregoing methods continuously, and such operation is preferred for all of described views. It should be mentioned that the methods can also be carried out intermittently, and as applied to FIGURE 1, for example, such intermittent method comprises first growing the cells in the fermentor until they stop growing, no dialysis step being employed and with the pump 13 not in operation. Cell growth will stop when the available nitrogen and mineral salts in the fermentor are used up. Then in a second step the pump is started up to initiate the dialysis step and remove metabolic products from the mixture in the fermentor. When the dialyzed mixture is returned to the fermentor, the pump is stopped. The next step comprises adding mineral salts to the fermentor to replace the nutrients that were used up. Cell growth thus resumes and is continued until it stops again because of lack of nutrients. The next step is the same as the second step, and the method then repeats itself. It is possible in this intermittent process to start out with water, either from the tap or distilled, in the dialysis tank rather than mineral medium, thus enabling a smaller initial amount of salts to be used. Any of the foregoing described methods may be operated intermittently by employing steps generally similar to those just set forth for the intermittent operation of the method of FIGURE 1.

The dialysis material is conventional, comprising a membrane of cellophane, parchment, collodion, regenerated cellulose, cellulose derivatives like the nitrate, acetate, and mixed nitrate-acetate, and the like. Membranes of nylon may be used. As is known, the membrane is a porous material which is permeable to solvent molecules like water and to substances in true solution therein but is impermeable to colloidal substances including higher molecular weight compounds like proteins. It is impermeable to micro-organisms. The membrane, which is frequently referred to as semipermeable, is used in various shapes, including sheets and tubes, and in various sizes and thicknesses.

The invention may be illustrated by the following examples.

EXAMPLE 1

A 2-liter fermentor containing the mineral salts nutrient having the composition listed above was innoculated with 15 cc. of a culture of *Nocardia salmonicolor* 107–332. Then a mixture of about 90 percent air and 10 percent butane was bubbled through the culture mixture, during agitation of the latter, at a rate corresponding to 500 cc. per minute of air, and the mixture was incubated at 30° C. The ensuring growth was followed by periodic optical density measurements, using a Bausch and Lomb colorimeter to adsorb visible light rays of a wave length of 400 millimicrons. After one week, the culture stopped growing at a density reading of 11, corresponding to a yield of cells of 4–5 g./l., dry weight. The culture did not exhibit further growth despite additions of such materials as urea and phosphate salts.

Then a dialysis tubing was set up by immersing the same in a fresh aqueous mineral salts medium contained in a 40-liter tank. The tubing was made of regenerated cellulose and had an inflated diameter of ⅝ inch. Its length was about 10 feet and its volume about 1 liter. Slow agitation of the fresh medium was started, and then the culture mixture from the small fermentor was pumped through the tubing at a rate of about 90 cc./minute, after which it was returned to the small fermentor. The equipment set up was like that shown in FIGURE 1. For reasons of safety, no pumping was done during times when the equipment was unattended. From optical density measurements, growth was immediately observed. Thus, where the maximum cell weight before dialysis was observed to be 4 to 5 g./l., the cell weight one day after dialysis had started was about 6 g./l.; seven days after dialysis had started, the weight increased to 26 g./l.; and after sixteen days it increased to 46.85 g./l., corresponding to a density reading of 175. During the course of the run, additional mineral salts medium was added from time to time to the large tank. The amount of such salt additions was substantially the same as the amount present in the fermentor at the very beginning of the experiment. When the density reading reached 41, corresponding to about 12.5 g./l. of cells, the air flow rate was increased to 1000 cc./minute and the butane rate was increased to maintain a 10 percent concentration. This increased flow rate was maintained to the end of the experiment. The run was continued for sixteen days during which the dialyzing step was employed. On the seventeenth day, for reasons unknown, the dialysis tubing became perforated and the run was stopped.

EXAMPLE 2

Using the same set up and flow as in Example 1, except that the dialysis tank had a volume of 27 liters, mineral salts nutrient in the 2-liter fermentor was inoculated with 50 cc. of a culture of the yeast, *Candida lipolytica*. Air was introduced to the culture mixture at a rate of 500 cc./minute, and a paraffinic kerosene was added through an inlet in the top of the fermentor at a rate of 3 cc. every 4 hours. This amount of kerosene was added at the start of the run, and the mixture incubated at 30° C. Growth took place and the extent of it was followed by optical density measurements as described in Example 1. On the first day the optical density was 6.3; after 6 days it was 26.6; after 8 days it was 29, corresponding to a cell weight of 7.98 g./l.; after 9 days it was 38.5, corresponding to 13.36 g./l. of cells; after 13 days it was 51, after which 3 cc. of a 50% aqueous solution of urea was added to the culture mixture; after 14 days the reading was 60, corresponding to 21.49 g./l. of cells; and after 16 days the reading was 84, corresponding to 35.91 g./l. of cells. All cell weights are on a dry basis. On the seventh day the air rate was increased to 1000 cc./minute.

After 16 days the run was concluded, at which time the medium in the dialysis tank, termed the dialysate, had a fairly intense orange-red color and a yeasty odor. A portion of the dialysate, approximately 7.3 liters, was taken from the tank and passed, overnight, through a quantity of carbon black granules. The carbon black removed the colored materials from the dialysate, giving a clear colorless dialysate which by resistivity measurements was shown to contain the mineral salts and which was considered to be reusable. The carbon black containing the adsorbed colored material was acidified, extracted in a Soxhlet with chloroform, the chloroform then evaporated, and the extract in an amount of 270 mg. was recovered. The extract was considered to comprise several products that had dialyzed through the tubing and of course were water soluble. Microscopic examination showed the extract to comprise a mixture of a viscous liquid and some crystals.

In other independent experiments on growing *Candida lipolytica* in which no dialysis step was employed, the yield of cells was in the range of 10–15 g./l., dry weight.

EXAMPLE 3

Using a slightly different dialysis setup than in Examples 1 and 2, mineral salts nutrient in a 25 ml. container was inoculated with 1 cc. of a culture of the bacterium *Pseudomonas aeruginosa*. The container was disposed over a 150 ml. dialysis tank and separated therefrom by a sheet of dialysis membrane. The tank contained aqueous mineral salts medium. The setup was agitated without forced aeration on a gyrorotatory shaker and p-cymene as the sole source of carbon was added through an inlet in the top of the container at a rate of 0.2 cc. per day. The mixture was incubated at 30° C. Growth took place and the extent of it was followed by optical density measurements as described in Examples 1 and 2. On the second day the optical density was 15.0; after two days it was 29.3; after three days it was 37.5, corresponding to a cell weight of 13.0 g./l.; after seven days it was 82.5; after eight days it was 105, corresponding to 23.0 g./l of cells. All cell weights are on a dry basis.

After eight days the run was concluded, at which time the medium in the dialysis tank had a fairly intense greenish color. This medium, or dialysate, comprising approximately 150 ml., was taken from the tank, acidified, and extracted with ethyl acetate. Microscopic examination showed the extract to comprise a mixture of crystals, these having been precipitated from solution upon acidifying. One of the products contained in the extract was identified as p-isopropylbenzoic acid.

In other independent experiments on growing *Pseudomonas aeruginosa* in which no dialysis step was employed, the yield of cells was in the range of 2–3 g./l., dry weight.

EXAMPLE 4

The arrangement employed in Example 3 was used in this case. Into the container 25 ml. of nutrient was placed and inoculated with 1 ml. of a culture of *Achromobacter sp.* Decane as the sole source of carbon was introduced at the rate of 0.2 cc. per day. The set-up was maintained at 30° C. and agitated without forced aeration. Growth took place and was followed by optical density measurements, as described. On the second day the optical density was 5.4; after three days it jumped to 54.4; after four days it was 90; and after five days it was 108.8, corresponding to 20.4 g./l. of cells, dry basis.

In other independent experiments on growing *Achromobacter sp.* in which no dialysis step was employed, the yield of cells was in the range of 5–10 g./l., dry weight.

It will be noted from Example 2 that the absorbent took up the chloroform solubles of the dialyzed cell products, comprising organic materials of a molecular size small enough to pass through the dialysis membrane. Dissolved salts however were not substantially absorbed but were left in the mineral medium. Besides carbon black, other amorphous carbonaceous materials suitable for use as absorbents include lamp black, activated carbon, coke, etc. Another material is adsorptive coal. These materials may be of any suitable form and size, but preferably they have a large surface area and are permeable to water. Other adsorbents may include silica gel, diatomaceous earth, kieselguhr, and clays like bentonite and montmorillonite. Still other suitable materials comprise powdered metal oxides like magnesium oxide, titanium dioxide, alumina, and zinc oxide, and adsorbent compounds like calcium carbonate. Also powdered glass, and powdered carboxymethyl cellulose. Other adsorptive, high surface area materials are also useful provided of course that they have the capacity to selectively adsorb organic compounds from an aqueous mixture which also contains dissolved salts. Generally speaking, inorganic adsorbents are preferred.

It will be understood that the invention is capable of obvious variations without departing from its scope.

In the light of the foregoing description, the following is claimed.

I claim:

1. In a method of growing aerobic hydrocarbon-utilizing micro-organisms in a fermentor in the presence of an aqueous mineral nutrient, a hydrocarbon as the sole source of carbon for energy and growth, and oxygen, wherein metabolic products are produced by the cells and at least some of said products in the course of time have the effect of inhibiting cell growth, the improved steps of increasing the growth of the cells comprising continuously removing from the fermentor a portion of the contents thereof including said growth inhibitors and coincidently filtering cells from the same, continuously passing said filtered portion to a dialysis zone while retaining the filtered cells in the fermentor, continuously passing an aqueous liquid to the dialysis zone, dialyzing said portion against said aqueous liquid, thereby purifying said portion by at least partially removing said growth inhibitors therefrom and taking up the same in said aqueous liquid, returning the purified portion to said fermentor to favorably influence growth of the cells therein, continuously passing said aqueous liquid from the dialysis zone to an inhibitor-removal zone separate from the latter and removing said growth inhibitors at least in part, then returning the aqueous liquid from the inhibitor-removal zone to the dialysis zone, the volume of aqueous liquid in the dialysis zone being less than that of the contents in the fermentor, continuously growing cells in the fermentor during the foregoing steps, and, as a result of said steps, accumulating cells in said fermentor in a yield of up to eight or more times greater than that obtainable by a like method which however omits said dialysis and said inhibitor-removal steps.

2. Method of claim 1 wherein said aqueous liquid is an aqueous mineral salt medium.

3. Method of claim 1 wherein said aqueous liquid is water.

4. Method of claim 1 wherein said growth-inhibiting products are removed from said aqueous liquid by adsorbing the same therefrom by means of an adsorbent.

5. Method of claim 4 wherein said adsorbing step is carried out in an adsorption zone immersed in said aqueous liquid, said adsorption zone being open to the passage therethrough of aqueous liquid.

6. Method of claim 4 wherein said adsorbing step is carried out in said aqueous liquid by dispersing said adsorbent therein.

7. Method of claim 1 wherein said growth-inhibiting products are removed from said aqueous liquid by passing the latter to a solvent extraction zone and extracting said products therefrom by direct contact with a selective solvent.

8. Method of claim 1 wherein the direction of flow between the fermentor and the dialysis zone is periodically reversed.

9. In a method of growing aerobic hydrocarbon-utilizing micro-organisms in a fermentor-disposed mixture comprising said micro-organisms, an aqueous mineral nutrient, a hydrocarbon as the sole source of carbon for energy and growth, and oxygen, wherein metabolic products are produced by the cells and at least some of said products in the course of time have the effect of inhibiting cell growth, the improved steps of increasing the growth of the cells comprising removing from the fermentor mixture a portion thereof including growth inhibitors and coincidently filtering cells from the same, passing said filtered portion to a dialysis zone while retaining the filtered cells in the fermentor, passing an unfermented aqueous liquid to the dialysis zone, dialyzing said filtered fermentor portion against said aqueous liquid, thereby purifying said portion by at least partially removing growth inhibitors therefrom and taking up the same in said aqueous liquid, returning said purified portion to said fermentor to favorably influence growth of the cells therein, passing said aqueous liquid from the dialysis zone to an inhibitor-removal zone and removing said growth inhibitors at least in part, then returning the aqueous liquid from the inhibitor-removal zone to the dialysis zone, periodically reversing the direction of flow of said fermentor mixture portion between the fermentor and the dialysis zone while continuing to filter cells from such portion as it leaves the fermentor, growing cells in the fermentor during the foregoing steps, and, as a result of said steps, accumulating cells in the fermentor in a yield of up to eight or more times greater than that obtainable by a like method which however omits said dialysis and said inhibitor-removal steps.

References Cited

UNITED STATES PATENTS

| 2,904,857 | 9/1959 | Goetz | 195—103.5 |
| 3,018,224 | 1/1962 | Ferrari | 195—103.5 |
| 3,186,917 | 6/1965 | Gerhardt et al. | 195—103.5 |
| 3,293,145 | 12/1966 | Leavitt et al. | 195—34 |

A. LOUIS MONACELL, *Primary Examiner.*

NORMAN ROSKIN, *Assistant Examiner.*

U.S. Cl. X.R.

195—28, 115